April 26, 1966 E. A. A. AXELSON Re. 26,000
ELECTRICAL PAINT HEATER
Original Filed April 3, 1961
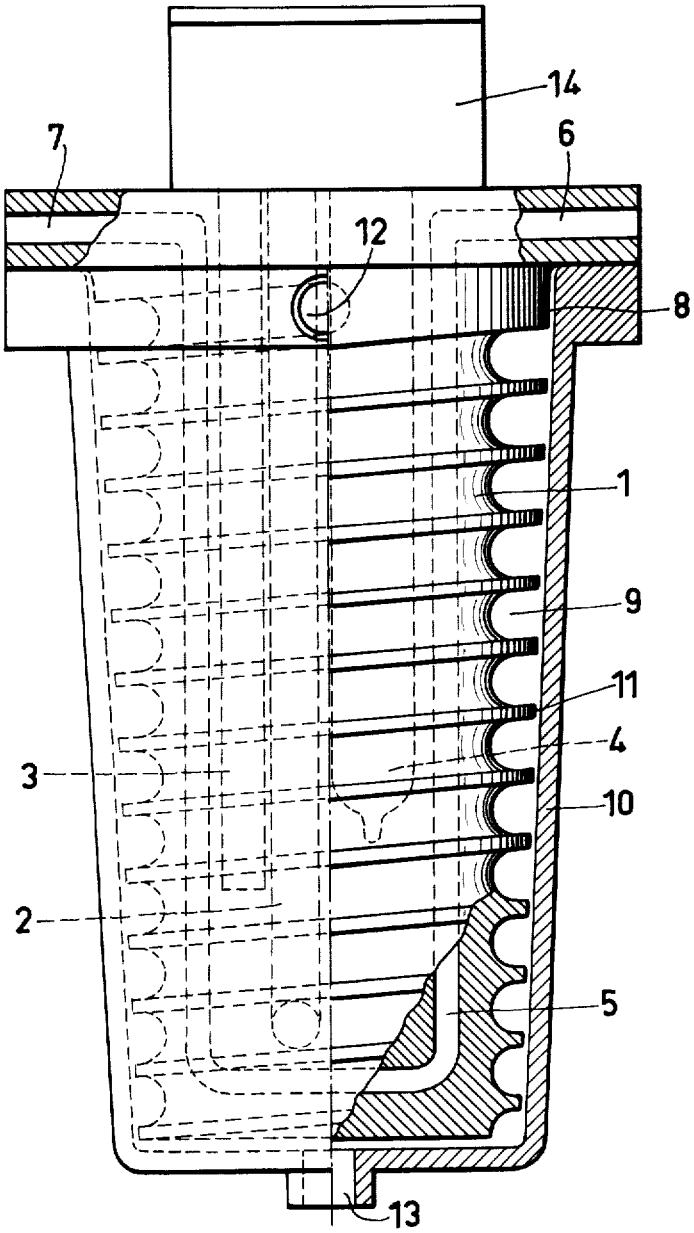

United States Patent Office

Re. 26,000
Reissued Apr. 26, 1966

26,000
ELECTRICAL PAINT HEATER

Eskil Anders August Axelson, Kungsholmsgatan 13, Stockholm, Sweden

Original No. 3,096,426, dated July 2, 1963, Ser. No. 100,057, Apr. 3, 1961. Application for reissue Nov. 16, 1964, Ser. No. 427,524
Claims priority, application Sweden, Apr. 6, 1960, 3,430
5 Claims. (Cl. 219—305)

Matter enclosed in heavy brackets [ ] appears in the original patent but forms no part of this reissue specification; matter printed in italics indicates the additions made by reissue.

This invention relates to an electrical flow heater adapted for heating liquids, and more particularly paints which are to be applied by a spray painting technique.

It is an object of the invention to provide an improved flow heater for paints which will deliver paint in a particular temperature range to a sprayer even following an interruption in the spraying operation.

It is previously known to heat paint by causing the paint to flow through an electrically heated, thermostat-controlled cylindrical metal body having a uniform helical groove in its periphery, which groove forms with a surrounding cylindrical pipe a channel for the paint flow.

In the aforesaid construction the paint flow channel is uniform all along its length and provides a constant cross-sectional area for the paint. The paint, however, enters the heating channel at room temperature and is thick and viscous, whereas the paint leaves the channel at a higher temperature and is thinner and less viscous. In order to reduce the pressure drop while the paint flows through the flow channel, and at the same time to increase the heat absorption, the channel should not be uniform, but should have a cross-sectional area which is largest at the inlet of the channel and which decreases towards the outlet. The variation in the channel cross-sectional area is preferably achieved by keeping the inner diameter of the channel constant throughout its length, and the outer diameter largest at the inlet of the channel while decreasing gradually towards the outlet of the channel. The metal body thus is of frusto-conical shape which permits the manufacture of both the metal body and the casing by chill casting or pressure casting.

The paint heater is provided with a heating element and a controlling thermostat, which prevents the paint contained within the heater from being overheated, for example, during an interruption in the spraying operation. The thermostat maintains the paint in a particular temperature range which for hot spraying is preferably between 50° C. and 90° C. It is essential, however, that the paint which is contained in the paint supply line (usually a rubber hose) extending from the paint heater to the spray gun be maintained at a substantially constant temperature when the spraying operation is interrupted. For this purpose, the metal body is provided with a steel tube, for example of U-shape, which is cast into the metal body and secured by welding to two bore channels in a steel flange which is secured to the metal body. Welded onto the opposite side of the said flange is a coupling housing for enclosing electrical connections. The compresed air passing through the said channels and the U-shaped steel tube is heated to approximately the same temperature as the paint. By directing the heated compressed air into a casing which, for example, surrounds the paint hose, the paint in the paint hose is heated during an interruption in the spraying operation and thereby is substantially maintained at operating temperature.

The said heat conducting frusto-conical metal body contains cast-in tubes for the electrical element, the thermostat, a safety-fuse and the tube for hot air.

An embodiment of the paint heater according to the invention is illustrated in the following drawing, wherein the paint heater is shown in side view and partly in section.

Referring to the drawing, numeral 1 designates the body which may be cast of silumin or aluminum. Within the body are encased a tube 2 for the electrical element, a tube 3 for the thermostat and a tube 4 for the fuse. A U-shaped tube 5 for the compressed air is also encased within the body and is provided with an inlet and outlet for the air. The body is of frusto-conical shape and in the periphery 8 of the body there is provided a helical groove 9. The groove decreases in depth in relation to decreasing diameter of the body. A frusto-conical casing 10 having a smooth inner surface surrounds the body and is in peripheral sealed contact with the portions 11 of the body 1. The groove 9 forms a closed helical channel through which the paint is adapted to pass. An inlet 12 and an outlet 13 are provided in the casing in communication with the groove 9 for the circulation of the paint through the helical channel. The U-shaped tube 5 is encased within the body in a peripheral zone between the tubes 2, 3, 4 and the helical groove 9. A flange is supported on the body 1 and is provided with laterally extending channels 6, 7 which are respectively in communication with the inlet and outlet of the U-shaped tube 5. A housing 14 is secured to the flange on the side thereof away from the body 1, the housing accommodating the electrical connections for the heater, thermostat and fuse.

What is claimed is:

1. An electrical flow heater for paint and compressed air, comprising: a one-piece thermally conductive body, a heating element encased in said body, said body being of frusto-conical shape and being provided with a helical groove peripherally formed therein, said groove decreasing in depth in relation to the decreasing diameter of said body, a frusto-conical casing having a smooth inner surface surrounding said body and in substantially peripheral sealing contact with said body whereby said helical groove provides a closed helical channel, said casing being provided with openings in communication with said groove at opposite ends of the body to constitute an inlet and an outlet for said channel to enable the circulation of paint through said channel, said paint absorbing heat from the body which is heated by the heating element as the paint traverses said path, and a U-shaped tube having an inlet and an outlet for air encased within said body, said tube extending in a peripheral zone in said body between the heating element and the closed channel.

2. A heater as claimed in claim 1, wherein the inlet is in communication with the helical groove at the maximum depth thereof and the outlet is in communication with the helical groove at the minimum depth thereof.

3. A heater as claimed in claim 1, comprising a flange supported on said one-piece body to permit installation of said body, said flange including channels therein in communication with said tube inlet and outlet, said channels extending laterally in said flange.

*4. An electrical flow heater for paint and compressed air comprising: a one-piece thermally conductive body, a heating element encased in said body, said body being of frusto-conical shape and being provided with a helical groove peripherally formed therein, a frusto-conical casing having a smooth inner surface surrounding said body and in substantially peripheral sealing contact with said body whereby said helical groove provides a closed helical channel, said casing being provided with openings in communication with said groove at opposite ends of the body to constitute an inlet and an outlet for said channel to enable the circulation of paint through said channel, said paint absorbing heat from the body which is heated*

*by the heating element as the paint traverses said path, and a U-shaped tube having an inlet and an outlet for air encased within said body, said tube extending in a peripheral zone in said body between the heating element and the closed channel.*

*5. An electrical flow heater for paint and compressed air comprising: a thermally conductive body, a heating element encased in said body, said body being of frusto-conical shape and being provided with a helical groove peripherally formed therein, a frusto-conical casing having a smooth inner surface surrounding said body and in substantially peripheral sealing contact with said body whereby said helical groove provides a closed helical channel, said casing being provided with openings in communication with said groove at opposite ends of the body to constitute an inlet and an outlet for said channel to enable the circulation of paint through said channel, said paint absorbing heat from the body which is heated by the heating element as the paint traverses said path, and a U-shaped tube having an inlet and an outlet for air encased within said body, said tube extending in a peripheral zone in said body between the heating element and the closed channel.*

References Cited by the Examiner

The following references, cited by the Examiner, are of record in the patented file of this patent or the original patent.

UNITED STATES PATENTS

| | | | |
|---|---|---|---|
| 2,576,558 | 11/1911 | Bede | 219—305 X |
| 2,592,340 | 4/1952 | Ronceray | 219—381 |
| 2,673,919 | 3/1954 | Arvins et al. | 219—302 |

FOREIGN PATENTS

| | | |
|---|---|---|
| 551,330 | 1/1932 | France. |

RICHARD M. WOOD, *Primary Examiner.*

MAX L. LEVY, A. BARTIS, *Examiners.*